(12) United States Patent  
Boren

(10) Patent No.: US 8,037,978 B1
(45) Date of Patent: Oct. 18, 2011

(54) EDDY CURRENT BRAKING SYSTEM FOR TROLLEY ZIP LINE CABLE

(76) Inventor: Daniel Boren, Kula, HI (US)

(*) Notice: Subject to any disclaimer, the term of this patent is extended or adjusted under 35 U.S.C. 154(b) by 1249 days.

(21) Appl. No.: 11/685,701

(22) Filed: Mar. 13, 2007

(51) Int. Cl.
F16D 65/36 (2006.01)

(52) U.S. Cl. ........ 188/156; 188/158; 188/161; 188/164; 104/281

(58) Field of Classification Search ............... 188/156, 188/158, 159, 161, 164, 165; 104/281, 283, 104/284
See application file for complete search history.

(56) References Cited

U.S. PATENT DOCUMENTS

| | | |
|---|---|---|
| 1,898,555 A | 2/1933 | McCune |
| 3,070,035 A | 12/1962 | Russo et al. |
| 3,506,862 A | 4/1970 | Nomura et al. |
| 3,723,795 A | 3/1973 | Baermann |
| 4,122,922 A | 10/1978 | Baermann |
| 5,862,891 A | 1/1999 | Kroger et al. |
| 6,041,897 A | 3/2000 | Saumweber et al. |
| 6,062,350 A | 5/2000 | Spieldiener et al. |
| 6,227,334 B1 | 5/2001 | Yumura et al. |
| 6,293,376 B1 | 9/2001 | Pribonic |
| 6,360,669 B1 | 3/2002 | Albrich |
| 6,412,611 B1 | 7/2002 | Pribonic |
| 6,533,083 B1 | 3/2003 | Pribonic et al. |
| 6,550,392 B2 | 4/2003 | Albrich |
| 2004/0262103 A1 | 12/2004 | Rosner |
| 2005/0191788 A1* | 9/2005 | Aisenbrey ............ 438/106 |
| 2006/0027134 A1 | 2/2006 | Steele et al. |
| 2006/0278478 A1 | 12/2006 | Pribonic et al. |
| 2007/0039788 A1* | 2/2007 | Fulton ............ 188/164 |
| 2008/0087510 A1* | 4/2008 | Pribonic ......... 188/165 |
| 2010/0043667 A1* | 2/2010 | Loser et al. ........ 104/284 |
| 2010/0107919 A1* | 5/2010 | Perakis ........... 104/112 |

FOREIGN PATENT DOCUMENTS

| | | |
|---|---|---|
| FR | 2.832.114 | 5/2003 |
| JP | 2005271704 | 10/2005 |
| WO | WO2005090113 | 9/2005 |

OTHER PUBLICATIONS

Boren, Daniel; Specification from U.S. Appl. No. 11/744,669, filed May 29, 2007, 31 Pages.
Boren, Daniel; Drawings from U.S. Appl. No. 11/744,669, filed May 29, 2007, 14 Pages.
Boren, Daniel; Current Claims from U.S. Appl. No. 11/744,669, filed Mar. 24, 2011, 5 pages.

* cited by examiner

*Primary Examiner* — Pamela Rodriguez
(74) *Attorney, Agent, or Firm* — Michael I. Kroll

(57) ABSTRACT

An eddy current magnetic braking system that is based on drag created when a conductor moves through a stationary magnetic field. As the magnetic field increases the drag value also increases. The invention provides a magnetic braking system for use on zip line/cable rides and trolleys. Alternate designs of the present invention include a magnetic braking system having a trolley that moves on a zip line/cable to a brake block which is connected to a pulley cable, as the trolley pushes the brake block, the pulley moves the conductor into a magnetic field creating an eddy current brake that slows the trolley to a stop.

12 Claims, 10 Drawing Sheets

EDDY CURRENT BRAKING SYSTEM FOR TROLLEY ZIP LINE CABLE

BACKGROUND OF THE INVENTION

1. Field of the Invention

The present invention relates generally to brake systems and, more specifically, to a trolley magnetic braking system comprising a magnetic member having a base with diverging arms having magnetic elements fixed thereto providing opposing spaced apart magnetic fields and a trolley mechanism having a conductive element fastened thereto and outwardly depending therefrom that is driven into the converging magnetic fields creating eddy currents that retard movement of the conductive element and attached trolley mechanism creating a braking system having no moving parts.

Alternate designs of the present invention include a magnetic braking system wherein the conductive member is removed from the trolley and attached via a zipline/cable to a brake block so that the trolley will engage the brake block at a predetermined point driving the cable attached conductive member into the magnetic field slowing the trolley to a stop. As the magnetic field increases the drag value also increases.

2. Description of the Prior Art

There are other braking systems designed for the same purpose. Typical of these is U.S. Pat. No. 1,898,555 issued to McCune on Feb. 21, 1933.

Another patent was issued to Yoshio Nomura et al. on Apr. 14, 1970 as U.S. Pat. No. 3,506,862. Yet another U.S. Pat. No. 3,723,795 was issued to Baermann on Mar. 27, 1973 and still yet another was issued on Oct. 31, 1978 to Baermann as U.S. Pat. No. 4,122,922.

Another patent was issued to Kroger et al. on Jan. 26, 1999 as U.S. Pat. No. 5,862,891. Yet another U.S. Pat. No. 6,041,897 was issued to Saumweber et al. on Mar. 28, 2000. Another was issued to Pribonic on 25, Sep. 2001 as U.S. Pat. No. 6,293,376 and still yet another was issued on Jul. 2, 2002 to Pribonic as U.S. Pat. No. 6,412,611.

Another patent was issued to Pribonic et al. on Mar. 18, 2003 as U.S. Pat. No. 6,533,083. Yet another France Patent No. FR2832114 was issued to Kroger Uwe on May 16, 2003. Another was issued to Yasuaki on Oct. 6, 2005 as Japan Patent No. JP2005271704.

U.S. Pat. No. 1,898,555

Inventor: Joseph McCune

Issued: Feb. 21, 1933

A traction increasing apparatus for rail vehicles, the combination with an electromagnet of a member carried by the vehicle, rods secured to said magnet, brackets secured to said member in which said rods are slidably mounted, springs for yielding maintaining said magnet supported above the rail, and means for maintaining said springs under initial compression.

U.S. Pat. No. 3,506,862

Inventor: Yoshio Nomura et al

Issued: Apr. 14, 1970

A brake system is claimed in which the eddy current braking devices are mounted to confront another rail laid parallel to a main rail for supporting a vehicle.

U.S. Pat. No. 3,723,795

Inventor: Max Baermann

Issued: Mar. 27, 1973

A novel eddy-current and hysteretic brake for track-bound vehicles is provided which incorporates resisting skids or rollers to eliminate wear problems associated with prior art brakes of this type. The particular magnetic construction of the pole surface is critical to obtain maximum hysteretic and eddy-current forces with a uniform air gap and the minimum energization. The pole surface is also formed to prevent undesirable air currents or the accumulation of dirt or other disturbing external build-up, while providing maximum pole surface and winding relationships. An alternating pole configuration is provided along the direction of movement of the vehicle.

U.S. Pat. No. 4,122,922

Inventor: Max Baermann

Issued: Oct. 31, 1978

An eddy current or hysteresis brake, preferably for track bound vehicles which is infinitely variable and wear-free. A cylindrical rotatable permanent magnet magnetized on its diameter is arranged between a pair of pole pieces in combination with the plurality of stationary magnets, each arranged to magnetize the pole pieces with opposite magnetic polarity. By rotating the cylindrical magnet, the magnetic field at the ends of the pole pieces can be varied from a maximum to zero. The generated flux is projected into the track. Braking occurs by induced eddy currents.

U.S. Pat. No. 5,862,891

Inventor: Uwe Kroger et al

Issued: Jan. 26, 1999

A magnetic rail brake, particularly an eddy current brake for rail vehicles, has at least one exciter coil which comprises a coil around a pole core as well as a device for holding the coil and/or for the protection against outside environmental influences. The pole core and/or protection device are composed of individual components which are at least largely electrically insulated with respect to one another.

U.S. Pat. No. 6,041,897

Inventor: Eckart Saumweber et al

Issued: Mar. 28, 2000

A magnetic brake, particularly a linear eddy-current brake for rail vehicles, having a magnet yoke which extends substantially along the whole eddy-current brake, has a concave shape with respect to a plane rail in its installed position.

U.S. Pat. No. 6,293,376

Inventor: Edward Pribonic

Issued: Sep. 25, 2001

Eddy current braking apparatus includes a linear array of spaced apart permanent magnets arranged for defining a slot therebetween. A diamagnetic or non-magnetic fin is disposed and sized for movement through the slot. A pivotal linkage enables the magnets to move with respect to the fin from a spaced apart first position to a second position in which the fin passes through the slot. A control mechanism selectively moves the magnets between the first and second positions.

U.S. Pat. No. 6,412,611

Inventor: Edward Pribonic

Issued: Jul. 2, 2002

An eddy current brake system with dual use conductive fin includes a linear array of spaced apart permanent magnets and a non-magnetic electrically conductive fin. The magnets are mounted with respect to the fin for enabling passage past one another at a distance sufficient to cause eddy currents to be induced resulting in a braking force between the magnets and the fin. A mechanical brake is provided for frictionally engaging the fin and a surface treatment of the fin and enables the fin to sustain mechanical abuse of friction without effecting a change in the eddy current braking.

U.S. Pat. No. 6,533,083

Inventor: Edward Pribonic et al.

Issued: Mar. 18, 2003

Eddy current braking Apparatus is provided which includes a single array of permanent magnet for providing a magnet flux. A electrically conducted member for exclusively engaging the magnetic flux provided by the single array of permanent magnet. The magnets and conductive member are mounted for enabling relative motion between the magnet array and the conductive member to produce any currents in the conductive member resulting in the braking force between magnets and the conductive member. The configuration of the magnets and the conductive member enable the braking system to be installed over curvilinear paths.

France Patent Number FR2832114

Inventor: Uwe Kroger

Issued: May 16, 2003

The brake is held clear of the rail in normal running of the train, but may fall onto the track if its support is damaged or breaks. The system includes a detector and monitoring program that monitors the distance (h) between the brake (2-7) and the track (1'). One or more distance detectors (11,12) measure the air gaps between the magnetic brake and the track.

Japan Patent Number JP2005271704

Inventor: Sakamoto Yasuaki

Issued: Oct. 6, 2005

PROBLEM TO BE SOLVED: To reduce heat generation and temperature rise of a rail in an eddy current brake device using the rail as a secondary conductor.
SOLUTION: The eddy current brake device is disposed at the position opposing to the rails 21, 22 in a rolling stock, and is equipped with an electromagnetic converters 11, 12 and a power converter 15. The electromagnetic converters 11, 12 generate the eddy current in the rail by the magnetic field generated according to the supplied current, and generate an electromotive force in connection with the change of relative position to the rail. The power converter 15 supplies current into the overhead wire or the device consuming or storing power based on the electromotive force impressed from the electromagnetic converters by supplying alternating exciting current into the electromagnetic converters based on the voltage impressed on the rolling stock from the overhead wire and generates the braking force.

While these brake systems may be suitable for the purposes for which they were designed, they would not be as suitable for the purposes of the present invention, as hereinafter described.

SUMMARY OF THE PRESENT INVENTION

A primary object of the present invention is to provide a magnetic braking system that is based on drag created when a conductor moves through a magnetic field.

Another object of the present invention is to provide a magnetic braking system that as the magnetic field increases the drag value also increases.

Yet another object of the present invention is to provide a magnetic braking system for use on zip line/cable rides and trolleys.

Still yet another object of the present invention is to provide a magnetic braking system comprising a trolley having a conductive member attached thereto that is driven into a magnetic field causing eddy currents which will retard movement of the conductive member within the magnetic field and thereby bring the attached trolley to a stop.

Another object of the present invention is to provide a magnetic braking system for a trolley having a magnetic member comprising a base having divergent arms extending therefrom with a plurality of magnetic elements attached thereto so that as a conductive member is driven along between the splayed magnetic fields increasing eddy currents will create sufficient drag to bring the conductive member to a stop.

Yet another object of the present invention is to provide an alternate magnetic braking system having the conductive member fastened by cable to a brake block positioned within the path of the trolley so that when engaged by the trolley the conductive member is driven into the magnetic field creating an eddy current that slows the trolley to a stop. As the magnetic field increases the drag value also increases.

Additional objects of the present invention will appear as the description proceeds.

The present invention overcomes the shortcomings of the prior art by providing a magnetic braking system that is based on drag created when a conductor moves through a magnetic field. As the magnetic field increases the drag value also increases. The invention provides a magnetic braking system for use on zip line/cable rides and trolleys.

Alternate designs of the present invention include a magnetic braking system having a trolley that moves on a zipline/cable to a brake block which is connected to a pulley cable, as the trolley pushes the brake block, the pulley moves the conductor into a magnetic field creating an eddy current brake that slows the trolley to a stop.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
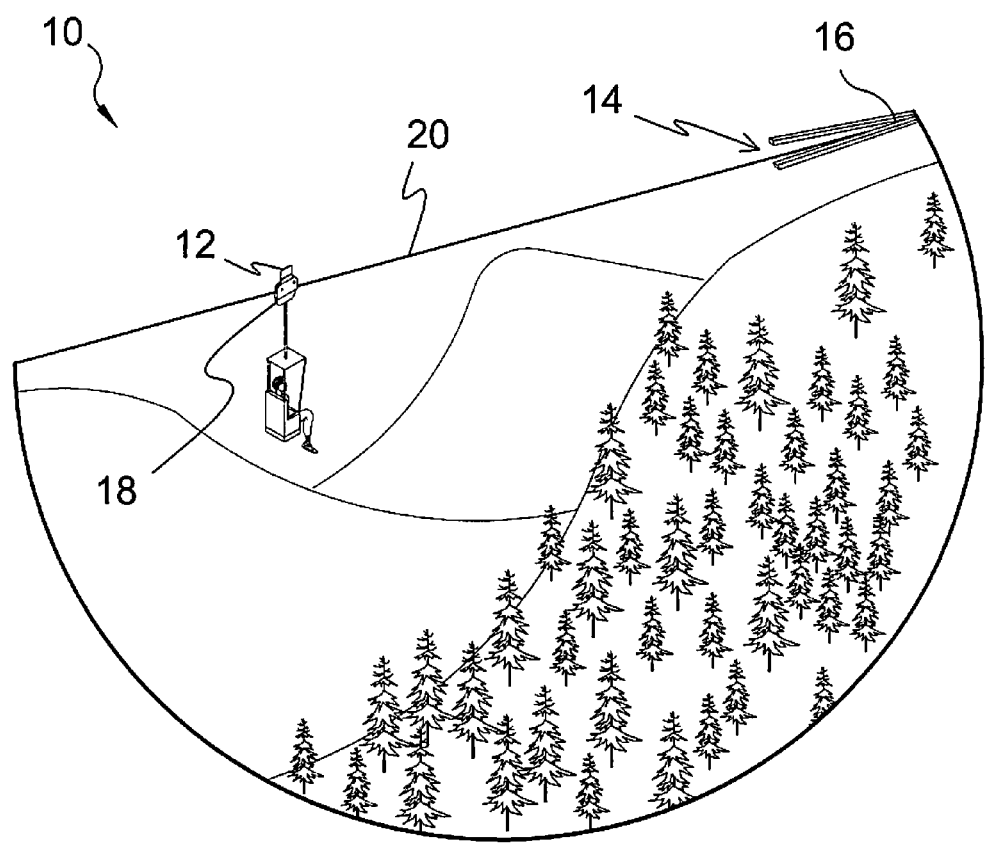
FIG. 1 is an illustrative view of the present invention in use.

Turning now descriptively to the drawings, in which similar reference characters denote similar elements throughout the several views, the figures illustrate the Eddy Current Braking System for Trolley Zip Line Cable of the present invention. With regard to the reference numerals used, the following numbering is used throughout the various drawing figures.

10 Eddy Current Braking System for Trolley Zip Line Cable of the present invention
12 conductor plate
14 magnetic field
16 magnetic field generator
18 trolley
20 zip line cable
22 magnetic elements
24 point of convergence of 16
26 point of entry of 16
28 eddy current
30 brake block assembly
32 brake line
36 pulley

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention is based on drag created when a conductor plate 12 moves through a magnetic field 14 created by a fixed, stationary magnetic field generator 16. As the magnetic field 14 increases the drag value also increases. The invention provides a magnetic braking system for use on zipline/cable 20 rides and trolley 18.

Figure 2:
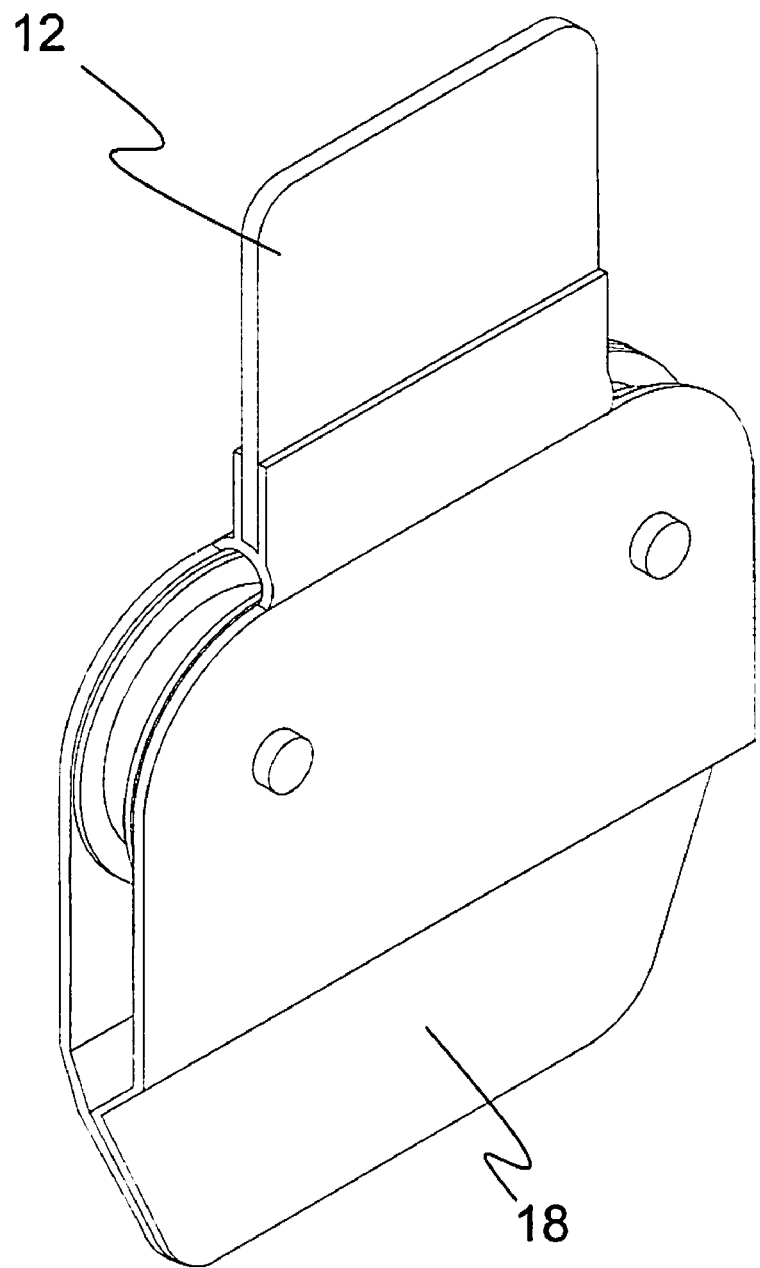
FIG. 2 is a perspective view of a trolley of the present invention in use.

FIG. 2 is a perspective view of a trolley 18 of the present invention. Shown is the trolley 18 of the present invention having a conductor plate 12 that moves through a magnetic field. As the magnetic field increases the drag value also increases. The invention provides a magnetic braking system for use on zipline/cable rides and trolley 18.

Figure 3:
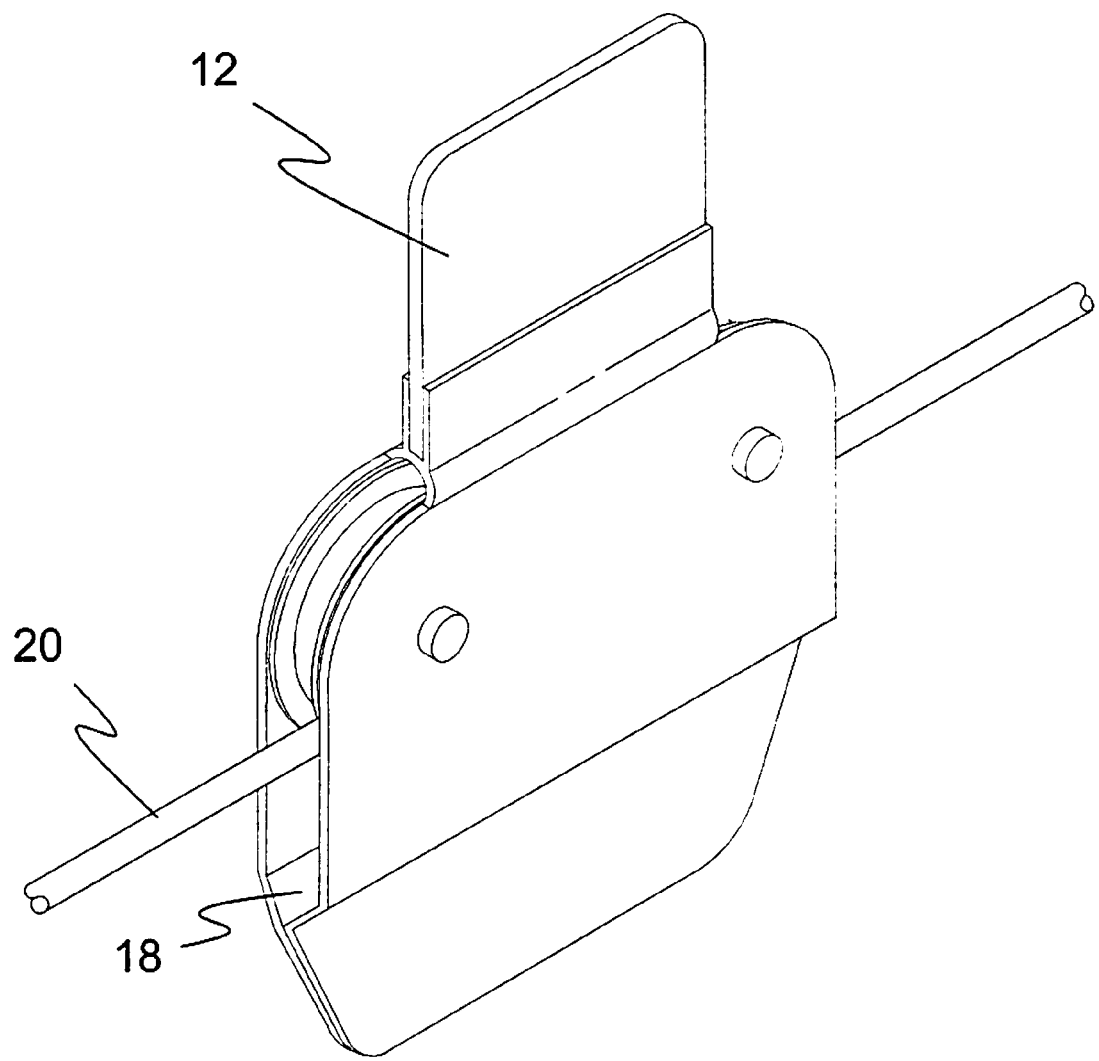
FIG. 3 is a perspective view of a trolley of the present invention in use.

FIG. 3 is a perspective view of a trolley 18 of the present invention in use. Shown is the trolley 18 of the present invention having a trolley 18 with a conductor plate 12 that moves along a zip line cable 20 through a magnetic field. As the magnetic field increases the drag value also increases. The invention provides a magnetic braking system for use on zipline/cable 20 rides and trolley 18.

Figure 4:
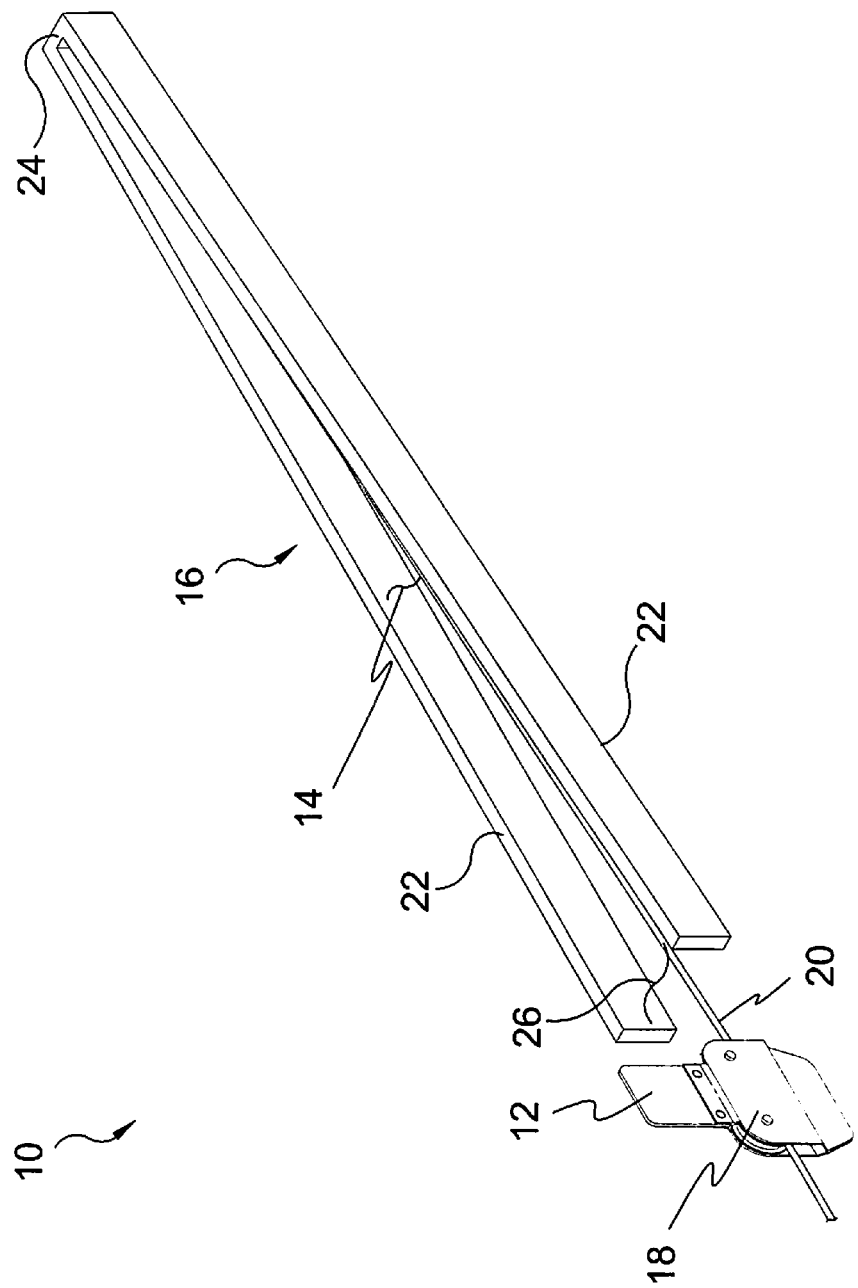
FIG. 4 is a perspective view of the present invention.

FIG. 4 is a perspective view of the present invention 10. Shown is the trolley 18 with a conductor plate 12 that moves on a zip line cable 20 through a magnetic field 14. As the magnetic field 14 increases the drag value also increases. The magnetic field 14 is formed by a fixed, stationary magnetic field generator 16 comprising two spaced apart magnetic elements 22 in a substantially V-shaped configuration joined together at a point of convergence 24 and with the spaced apart ends forming a point of entry 26 for the conductor plate 12 to enter the magnetic field 14 disposed therebetween. The magnetic elements can be permanent magnets, electro-magnets powered by an A/C source, or a combination of permanent magnets and electro-magnets.

Figure 5:
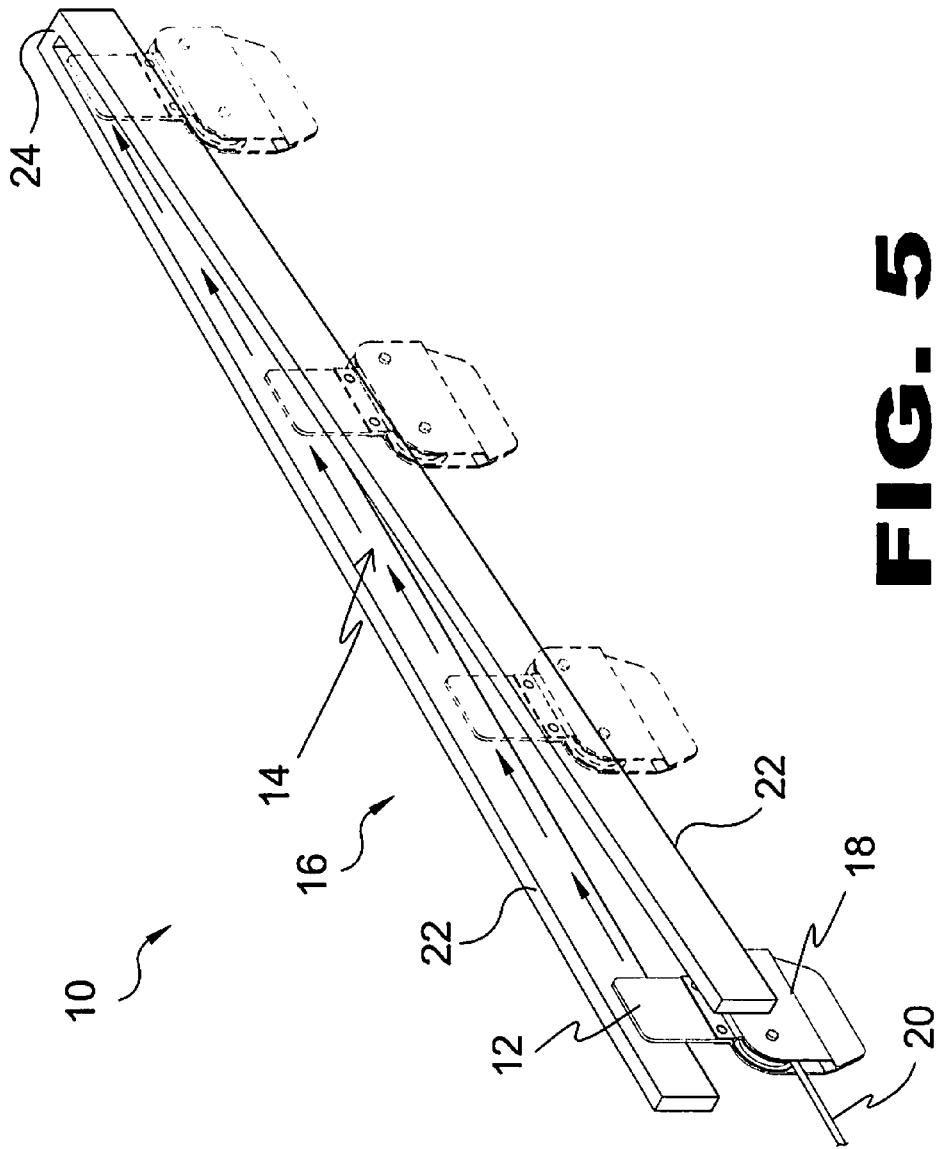
FIG. 5 is a perspective view of the present invention in motion.

FIG. 5 is a perspective view of the present invention 10 in motion. Shown is the trolley 18 having a conductor plate 12 that moves on a zip line cable 20 through a magnetic field 14. The conductor plate 12 disrupts the magnetic field 14 thereby creating opposing eddy currents which apply drag to the conductor plate 12 to slow down the movement thereof and eventually stop it altogether. The V-shape configuration of the magnetic elements 22 of the magnetic field generator 16 increases the concentration of the magnetic field 14 and the resultant eddy currents as the conductor plate 12 approaches the point of convergence 24 thereby exponentially increasing the intensity of the magnetic field 14. As the magnetic field 14 increases the drag value also increases. The point of convergence 24 or base functions as a mechanical fail safe to prevent further movement of the conductive plate upon reaching the base if full braking does not occur due to mechanical braking.

Figure 6:
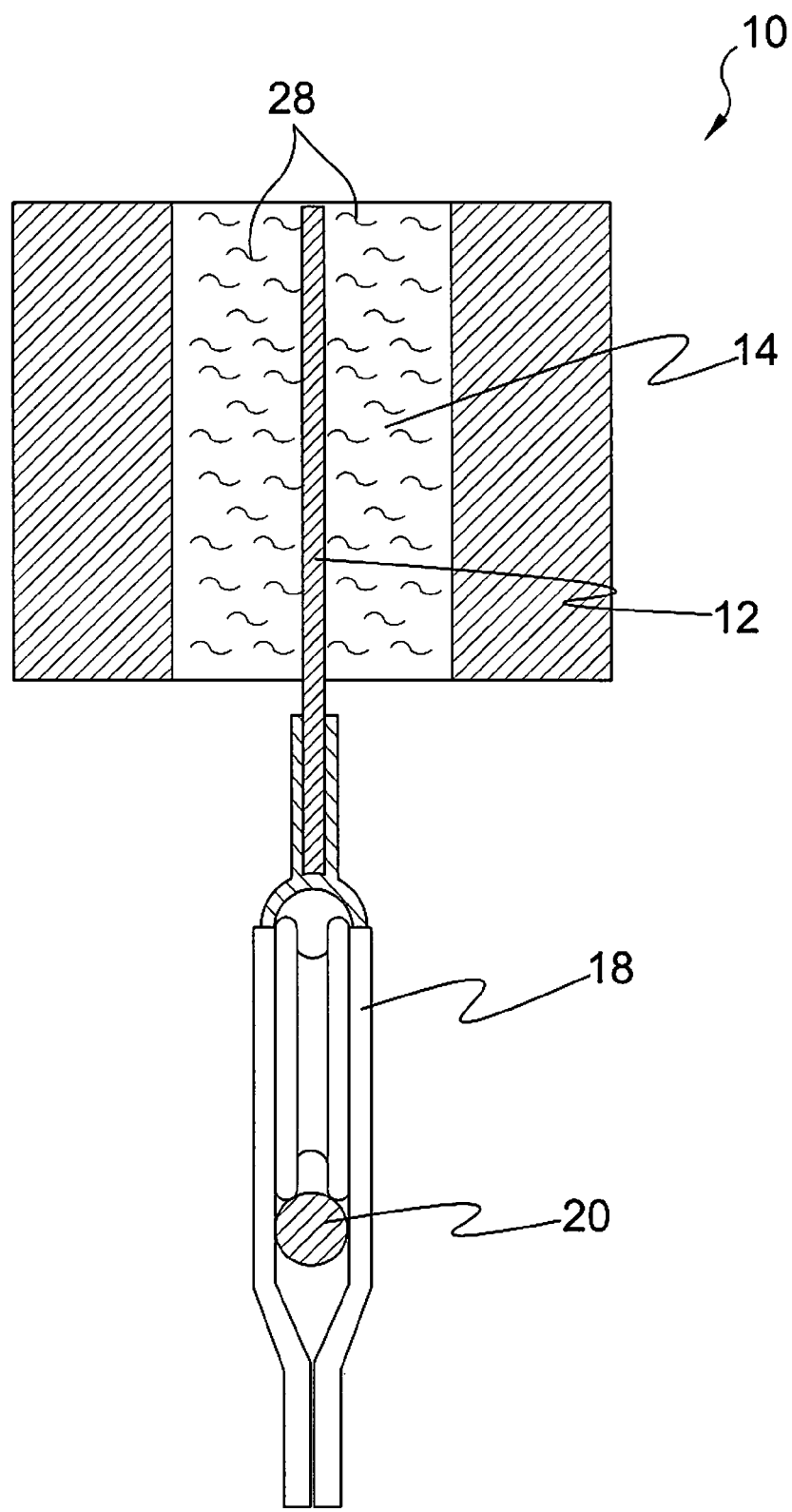
FIG. 6 is a frontal view of the present invention.

FIG. 6 is a frontal view of the present invention 10. Shown is the trolley 18 having a conductor plate 12 that moves on a zip line cable 20 through a magnetic field 14 which is disturbed and induces opposing eddy currents 28 that apply drag to the conductor plate 12. As the magnetic field 14 increases the drag value also increases.

Figure 7:
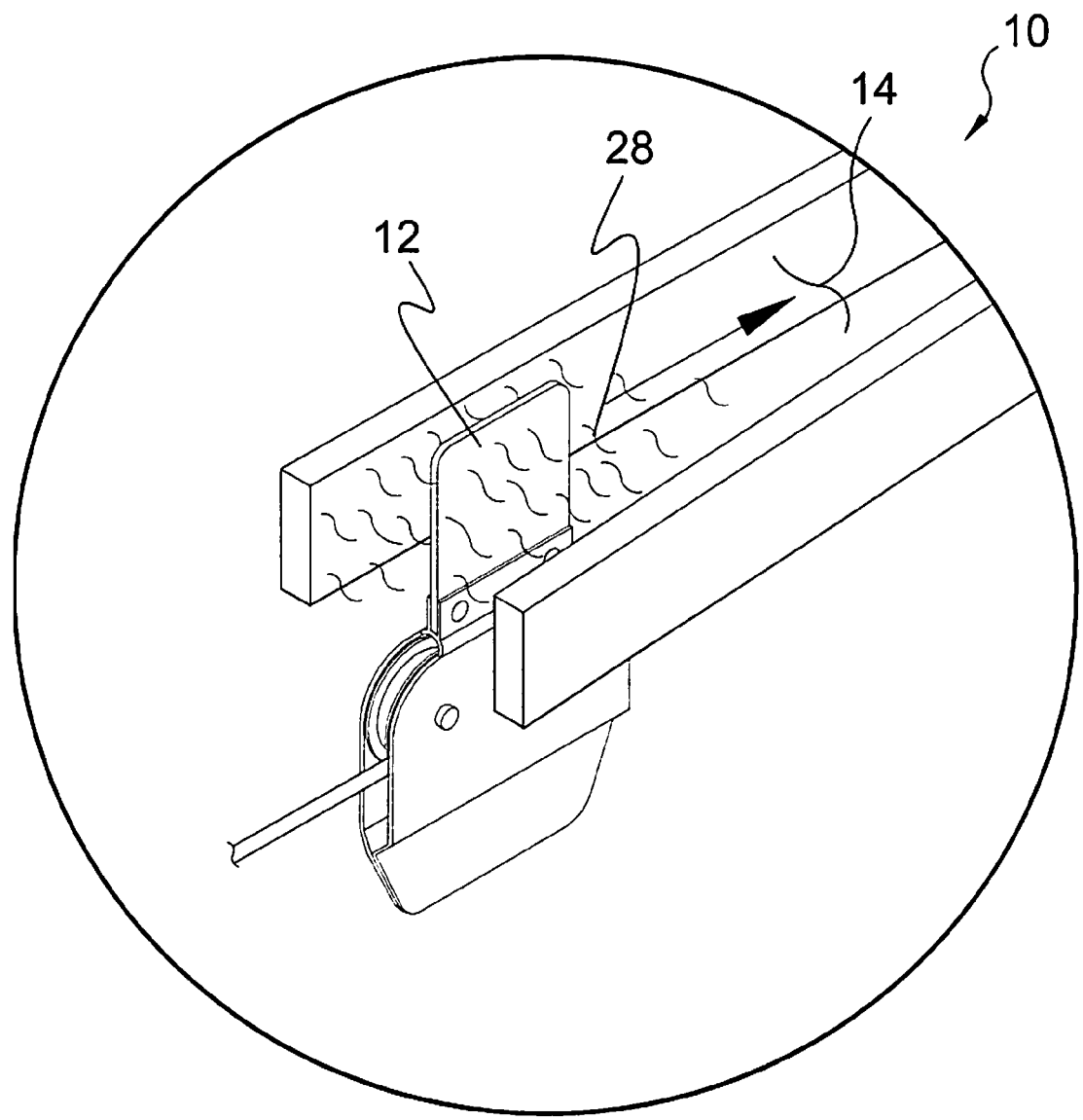
FIG. 7 is a detailed view of the present invention.

FIG. 7 is a detailed view of the present invention 10. Shown is the conductor 12 having passed into the magnetic field 14 wherein the disturbance thereto creates opposing eddy currents 28 that apply drag to the conductor plate 12. As the magnetic field 14 increases the drag value also increases.

Figure 8:
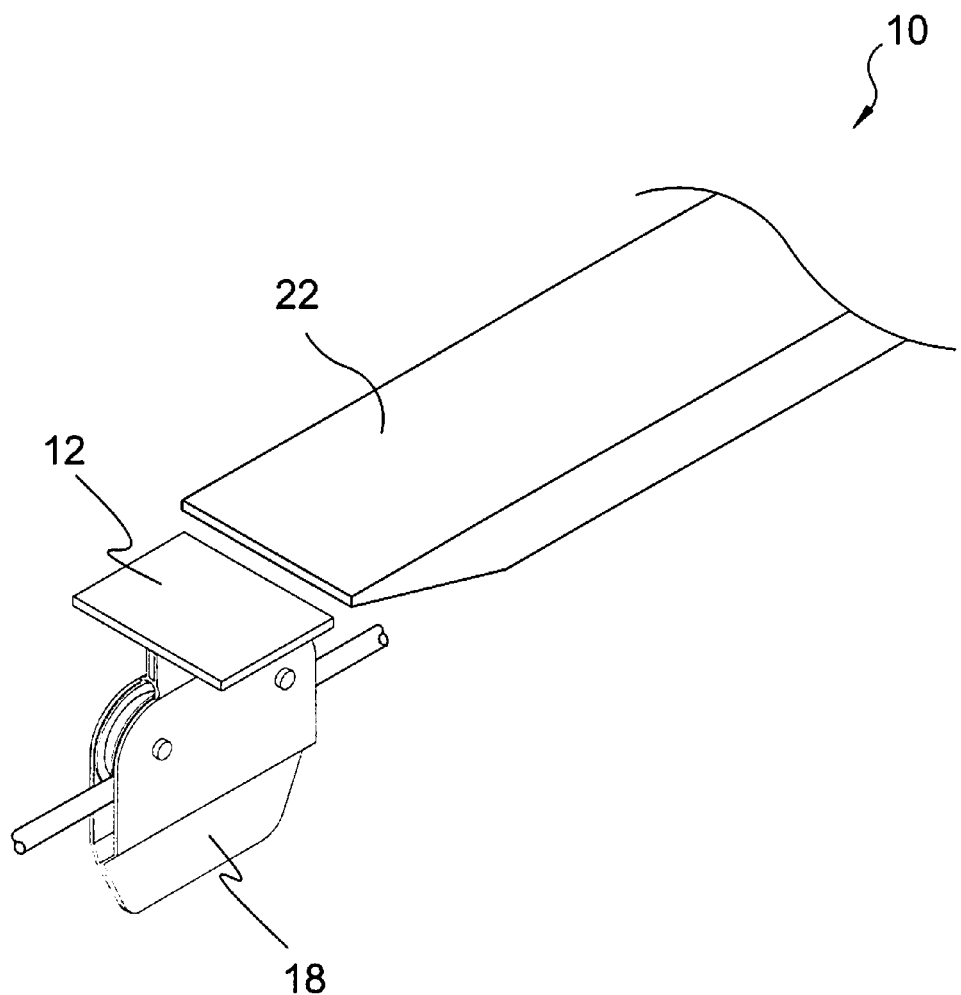
FIG. 8 is an alternate design view of the present invention.

FIG. 8 is an alternate design view of the present invention 10. Shown is an alternate design of the trolley 18 of the present invention having a conductor 12 that is secured to trolley 18 in perpendicular relation therewith. The magnetic element 22 is reconfigured accordingly.

Figure 9:
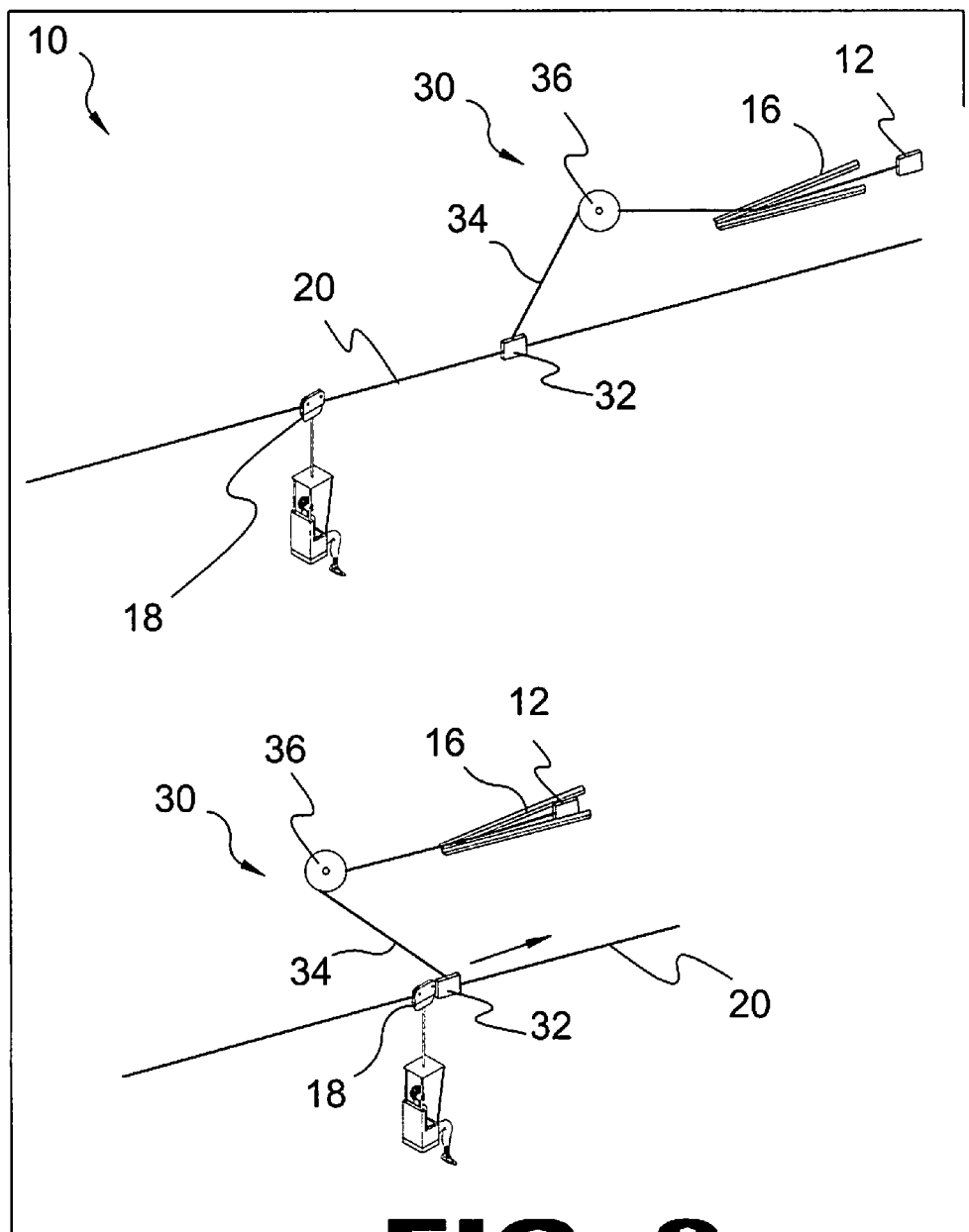
FIG. 9 is an alternate way the braking system can be remotely engaged.

FIG. 9 is an alternate way the braking system can be remotely engaged. Shown is a brake block assembly 30 having a brake block 32 slidably disposed on the zip line cable 20. The magnetic field generator 16 and conductor plate 12 are disposed in a remote location and the conductor plate 12 is connected to the brake block 32 via a brake line 34 and a pulley 36. The trolley 18 strikes the brake block 32 which moves therewith thus pulling the brake line 34 and drawing the conductor plate 12 into the magnetic field to initiate braking. This effectively removes the rider from the magnetics since the trolley 18 does not have an affixed conductor plate 12.

Figure 10:
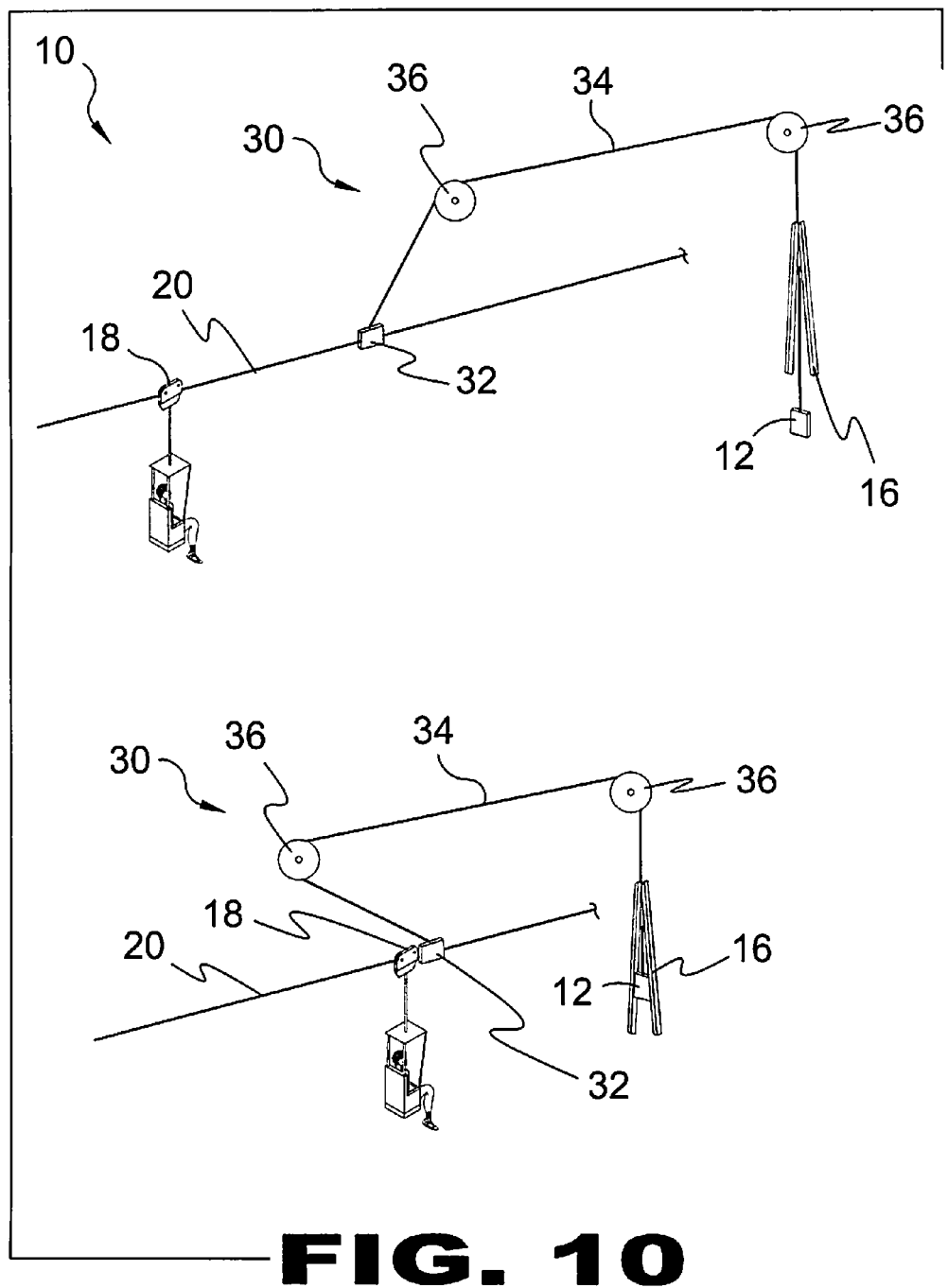
FIG. 10 is another alternate way the braking system can be remotely engaged.

FIG. 10 is another alternate way the braking system can be remotely engaged. Shown is a brake block assembly 30 having a brake block 32 slidably disposed on the zip line cable 20. The magnetic field generator 16 and conductor plate 12 are disposed in a remote location and the conductor plate 12 is connected to the brake block 32 via a brake line 34 and a pair of pulleys 36 rigged to allow the magnetic field generator 16 to be positioned in a substantially vertical position with the point of entry 26 at the inferior end. The trolley 18 strikes the brake block 32 which moves therewith thus pulling the brake line 34 and drawing the conductor plate 12 upwards into the magnetic field to initiate braking. The added benefit of this configuration is that gravity can automatically reset the brake system 10.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

The invention claimed is:

1. A zip line cable system, the system comprising:
   a) an elevated zip line cable having a first end secured to a first point and a second end to a second point;
   b) a trolley for transporting a load along said zip line cable;
   c) a conductive plate in communication with said trolley;
   d) a fixed magnetic field generator disposed at one end of said zip line cable, said magnetic field generator comprises a pair of spaced apart opposing magnetic elements, the magnetic elements forming a bifurcated substantially V-shaped configuration, the magnetic elements outwardly depending in a diverging manner from a base, the magnetic elements have distal ends providing a point of entry for said conductive plate and a magnetic field disposed therebetween;
   e) wherein when the conductive plate passes through the point of entry, the magnetic field provides sufficient drag to smoothly slow down and stop further movement of the trolley as the conductive plate moves between the magnetic elements toward the base.

2. The system recited in claim 1, wherein said magnetic elements are permanent magnets.

3. The system recited in claim 1, wherein said magnetic elements are electro-magnets powered by an A/C source.

4. The system recited in claim 1, wherein said magnetic elements a combination of permanent magnets and electro-magnets.

5. The system recited in claim 1, wherein said conductive plate is secured directly to said trolley.

6. The system recited in claim 1, wherein said conductive plate is part of a brake block assembly acted upon by said trolley.

7. The system recited in claim 6, wherein said brake block assembly further comprises:
   a) a brake line slidably secured to said zip line cable proximal the desired area for braking said trolley;
   b) a brake line cable having a first end secured to said brake block and a second end secured to said conductive plate; and
   c) at least one pulley for redirecting said brake line.

8. The system recited in claim 7, wherein said brake block assembly is activated when said trolley makes contact with said brake block during travel along said zip line thereby pushing it therewith to pull said brake line through said pulley and drawing said conductive plate into said magnetic field to initiate braking.

9. The system recited in claim 8, wherein a plurality of pulleys are used to rig said brake block assembly with said magnetic field generator in a substantially vertical position thereby having said conductor plate pulled upward into said magnetic field.

10. The system recited in claim 9, wherein said brake block assembly is reset by gravity.

11. The eddy current braking system recited in claim 1, wherein said magnetic field generator further includes a mechanical fail safe, wherein if full braking does not occur due to magnetic braking, said conductive plate will be prevented from further movement upon reaching the base of the magnetic field generator.

12. An eddy current braking system in combination with a trolley and a zip line cable, the eddy current braking system providing sufficient drag to smoothly slow down and stop further movement of the trolley, the combination comprising:
   a) said zip line cable having a first end secured to a first point and a second end to a second point;
   b) said trolley for transporting a load along said zip line cable;
   c) said conductive plate in communication with said trolley;
   d) a fixed magnetic field generator disposed at one end of said zip line cable, said magnetic field generator comprises a pair of spaced apart opposing magnetic elements, the magnetic elements forming a bifurcated substantially V-shaped configuration, the magnetic elements outwardly depending in a diverging manner from a base, the magnetic elements have distal ends providing a point of entry for said conductive plate and a magnetic field disposed therebetween;
   e) wherein said trolley travels freely along said cable until reaching a predetermined braking and stopping area and said conductor plate is urged by the trolley to pass by said point of entry into said magnetic field and continue therealong;
   f) said magnetic field is disturbed by the entry of said conductive plate therein thus resulting in a plurality of swirling electrons inducing magnetic fields called eddy currents between said magnetic elements and said conductive plate;

g) said eddy currents swirl in such a manner as to oppose the disturbance created by the moving conductive plate thereby effectively slowing the movement therealong and eventually stopping it altogether; and h) the V-shape of said magnetic field generator increases the eddy currents as the distance between said magnetic elements decreases thereby exponentially increasing the drag value and braking capacity thereof as said conductive plate moves along the magnetic field.

* * * * *